March 23, 1954 W. G. MOORE 2,673,286
PORTABLE DECORATIVE ILLUMINATING DEVICE
Filed June 19, 1953
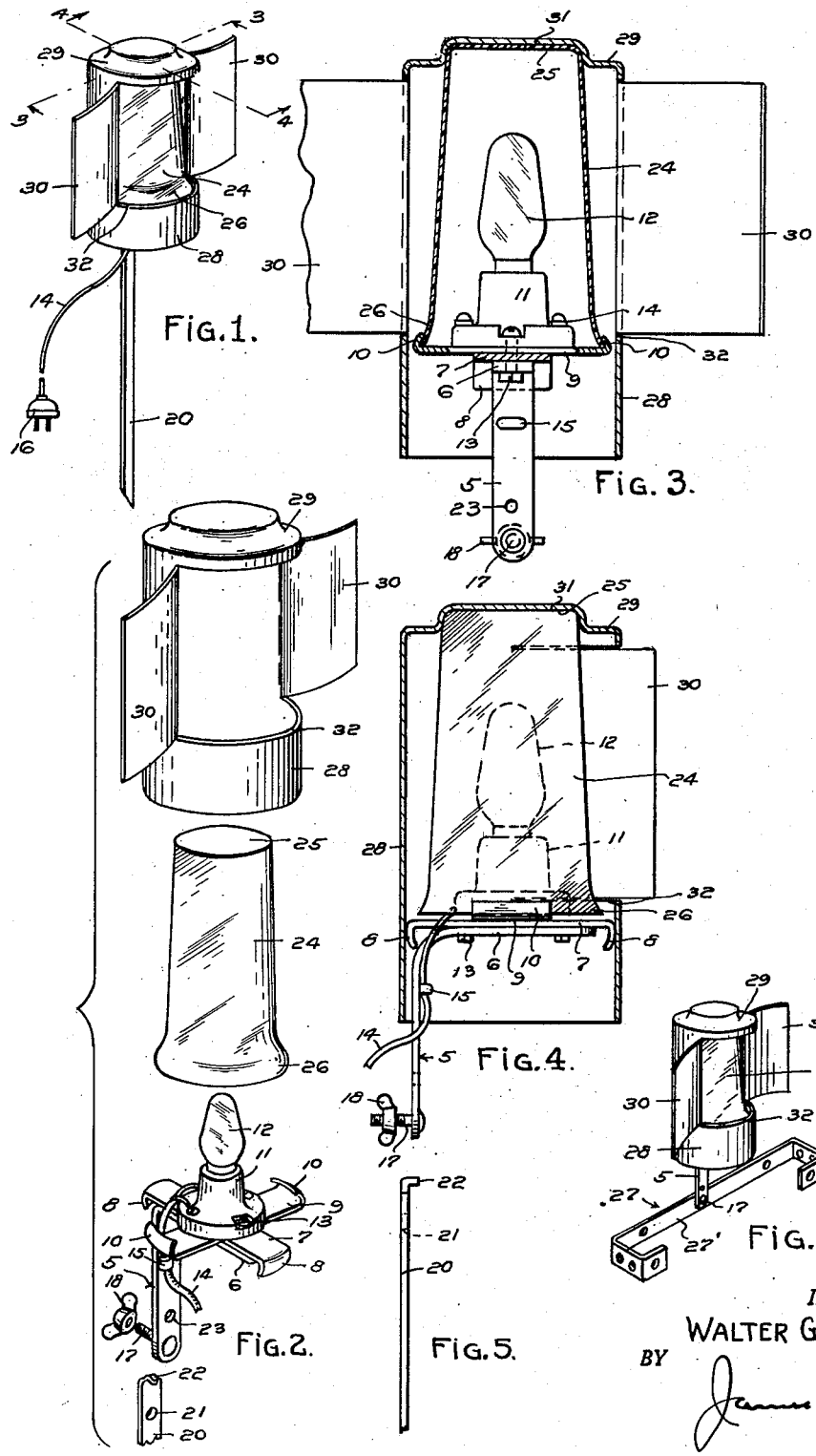
INVENTOR.
WALTER G. MOORE,
BY
ATTORNEY Patented Mar. 23, 1954

2,673,286

UNITED STATES PATENT OFFICE 2,673,286

PORTABLE DECORATIVE ILLUMINATING DEVICE

Walter G. Moore, West Palm Beach, Fla.

Application June 19, 1953, Serial No. 362,738

5 Claims. (Cl. 240—11.2)

This invention relates to a portable illuminating device that has particular reference to a simple and novel form of such device that is designed primarily for use in the illumination of gardens, patios, walkways and the like.

It is an object of the invention to provide a novel form of device that is designed to furnish a relatively subdued light free from glare and which may be arranged at selected points to define a walkway, a patio, or that may be directed upon flower borders, bushes, trees or the like, and which embodies a novel form of shield whereby the illumination may be controlled over a wide area or restricted to a particular point.

The device contemplates a device of the above noted nature that is simple in construction, substantially waterproof, extremely cheap to manufacture and readily adapts itself for detachable connection to a supporting ground stake or other forms of brackets whereby the device may be arranged in many different places with a minimum of effort. The device also embodies a novel form of translucent cover for the source of illumination which may be used with or without a protective shield and with the translucent device being quickly and easily assembled with respect to the source of illumination and with the translucent device and the source of illumination being quickly and easily assembled with respect to the shield without the use of fastening devices.

Further objects and advantages of the invention will be clearly apparent during the course of the following description, reference being had to the accompanying drawings, wherein has been illustrated a preferred embodiment of the invention and wherein like characters of reference are employed to denote like parts throughout.

In the drawings,

Figure 1 is a perspective view of the device mounted upon a ground stake.

Figure 2 is a perspective view of the several parts in their disassembled relation, Figure 3 is a central vertical sectional view taken substantially on line 3—3 of Figure 1, Figure 4 is a similar view taken substantially on line 4—4 of Figure 1, Figure 5 is a fragmentary edge view of a ground stake, and Figure 6 is a perspective view of the device mounted upon a supporting bracket.

Referring specifically to the drawings, the numeral 5 indicates an angle bracket, the legs of which are at right angles to each other. Rigidly connected to an upper leg 6 of the bracket 5 is a plate 7, the opposite ends of which are bent downwardly and inwardly as at 8 with the ends 8 being arcuate in top plan, for a purpose to be presently described. Rigidly supported upon the plate 7, centrally thereof and at right angles thereto, is a plate 9, the opposite ends of which are upwardly and inwardly bent as at 10 to form hook-like devices that are likewise arcuate in top plan. Supported upon the plate 9 is an electrical receptacle 11, here illustrated as a conventional porcelain base for the reception of a standard low wattage lamp bulb 12. Bolts 13 pass through the base of the receptacle 11 and through the plates 7, 9 and leg 6, and serve to rigidly bind the plates and the receptacle into a unitary construction. Electrical conductors 14 are connected in a conventional manner with the receptacle 11 and are trained downwardly through a loop 15 carried by the vertical leg of the bracket 5, the free ends of the conductors 14 being provided with a conventional plug-in device 16 for connection with the source of electrical energy. Adjacent the lower end of the vertical leg of the bracket 5 is a fixed threaded bolt 17 engaged by a wing nut 18. The bolt 17 and wing nut 18 serve to rigidly connect the bracket 5 to a ground stake 20, the ground stake being apertured at 21 for the reception of the bolt 17 and with the ground stake further being provided with a right angularly directed lug 22 for engagement within an opening 23 of the bracket. Thus, with the ground stake 20 engaged with the bolt 17, the lug 22 will be simultaneously engaged with the aperture 23 and, with the wing nut 18 turned up tightly, the ground stake will be securely held against shifting movement with respect to the bracket 5.

Detachably connected with the plate 9 is a relatively flexible translucent light diffusing cover 24, preferably formed of relatively thin plastic material. The cover 24 tapers upwardly to a flat end 25 with its lower end 26 formed open and flaring outwardly. The cover 24 is generally frusto-conical in shape and at assembly with the plate 9, the flaring end 26 is flexed inwardly to have snapping engagement beneath the hook ends 10, whereby the cover 24 will be securely supported in overlying relationship to the receptable 11 and lamp 12 and offers substantial protection against the entry of water or other foreign elements to the connections for the conductors 14.

The structure so far described may be used in various positions for a diffused light source over a relatively wide area and may be supported either upon the ground stake 20 or upon a base frame 27, shown in Figure 6. While the conductors 14 have been shown as terminating with the plug-in device 16, it follows that a plurality of the devices may be connected in series, since the wattage of the lamp 12 is relatively low and permits of the arrangement of the devices in series without danger of overloading a particular circuit. The cover 24 is quickly and easily removed for cleaning or replacing a lamp 12 by simply pressing the sides of the device with the fingers until the flared end 26 is released from the hook ends 10.

In many cases it is desirable that the light be controllable to direct its glow upon a particular spot or area and, to accomplish this, there has been provided a cylindrical and preferably metallic shield 28, the lower end of which is formed entirely open and with the upper end closed at 29. The shield 28 is circumferentially cut for substantially half its diameter and with the side wall vertically cut and its opposite sections bent outwardly to form wings 30, leaving the side of the shield 28 open for its major height and for substantially half its diameter as a sight opening to expose the cover 24. The wings 30 may be adjustable inwardly or outwardly to effectively control the area of illumination. The end 29 of the shield 28 is upwardly recessed at 31 for the seating reception of the upper flat end of the cover 24 at assembly. The shield 28 is engaged over the cover 24 and its associated parts and frictionally engages the arcuate ends 8 of the plate 7 and at its maximum point of engagement the flat end of the cover 24 is fully seated within the recess 31 and, as clearly shown in Figures 3 and 4, the flared end 26 of the cover lies slightly below the lower end of the opening 32 of the shield. Thus, the shield is securely frictionally held with respect to the bracket 5 and its associated plate 7 and is prevented from tilting laterally by the engagement of the end 25 of the cover 24 within the recess 31. The shield is quickly and easily removed by simply grasping the vertical leg of the bracket 5 and pulling the assembly downwardly or in opposite directions, there being no bolts or other fastening devices to be removed. Thus, the shields can be quickly and easily removed or just as quickly replaced when it is desired to vary the degree of illumination. The shield 28, while shown as being of sheet metal form, may obviously be cast or otherwise formed, and while the plates 7 and 9 have been shown as being separate and connected through the medium of the bolts 13, it will also be clearly apparent that this device can be cast as an integral unit. In the use of the device under a particular condition, the ground stake 20 is connected to the bracket 5 in a manner just described, and since the ground stake 20 has its lower end bevelled to form a relatively sharp end, it is shoved into the ground at the point where the illumination is desired and the plug 16 engaged in the conventional manner with a source of electrical energy. The shield 28 may be rotated to control the direction of illumination. Where a plurality of the devices are to be used for a residence, to define a sidewalk or a patio area, the devices may be suitably wired and connected in series, and with the shields 28 directing the light to the desired area. If it is found that a general overall illumination is desired, the operator can quickly and easily slip the shields 28 from each of the devices. The covers 24 are adapted to be formed in various colors for imparting a decorative series of illuminating devices and are obviously interchangeable at will.

The bracket 27, illustrated in Figure 6, embodies a straight bar that has its ends bent at right angle and then bent inwardly to parallel the bar 27' with the opposite ends and intermediate portions of the device being apertured for the reception of the attaching bolt 17. Thus, the bracket 27 serves a useful purpose as a ground supporting foot for the illuminating device or may be arranged in various ways upon a wall, tree or other place and serves as a connecting means for the illuminating device.

It will be apparent from the foregoing that an extremely simple and highly effective illuminating device has been provided. The parts are few and simple, are strong, durable, cheap to manufacture and easily assembled or disassembled and effectively serves in many areas where a relatively subdued or decorative light is desired. The cover 24 in its assembled relation with the shield 28 is inwardly spaced at its flared end from the shield to further prevent the entry of water to the receptacle by capillary attraction.

It is to be understood that the invention is not limited to the precise arrangement shown, but that changes may be made as readily fall within the spirit of the invention or the scope of the subjoined claims.

Having described my invention, what I claim as new and desire to secure by Letters Patent is:

1. An illuminating device in combination with a support therefor, a rigid bracket having detachable and non-shifting attachment to the support, the bracket also having connected therewith an upstanding lamp socket carrying a lamp bulb, a translucent cover that is disposed over the bulb and socket, the cover being detachably connected on the bracket, the socket being connected to a source of electrical energy, a shield that is disposed over the cover and which extends below the lower end of the cover to be detachably supported on the bracket, the shield having a side wall that is cut away for the major height and for substantially half the diameter of the shield to form a sight opening to expose the translucent cover and to permit the passage of light from the bulb, the shield provided with outwardly directed side wings at opposite sides of the sight opening with the wings being shiftable toward and from the sight opening to vary the horizontal angularity of an area of light from the lamp.

2. The device according to claim 1, wherein the translucent cover is substantially frusto-conical in shape with its lower end open and outwardly flared and with its opposite end closed and flat, the shield being substantially cylindrical and of a length to fully overlie the cover and with its lower end open and its upper end closed and recessed for seating engagement over the upper flat end of the cover, friction means carried by the bracket for engaging and supporting the shield in its overlying relationship to the cover, the friction means permitting the rotation of the shield with respect to the bracket and the cover to control the direction of the illumination.

3. The device according to claim 2, wherein the connecting means for the cover and the shield comprises a pair of plates that are crossed intermediate their ends at a right angle to each other, the plates and the lamp socket being rigidly connected to an arm of the bracket, one of the plates having its opposite ends upwardly and inwardly bent for snapping engagement with the flared end of the cover, the other of said plates having its opposite ends downwardly and inwardly bent to have frictional engagement with the inner wall of the shield, the seating engagement of the upper end of the cover within the recess of the shield maintaining the shield and cover in axial alignment, the support comprising a ground stake that is detachably connected to the bracket and with means to prevent lateral shifting of the stake with respect to the bracket.

4. The device according to claim 1, wherein the bracket is L-shaped and comprises a flat horizontal arm and a flat vertical arm, a flat plate supported on the horizontal arm parallel therewith, the opposite ends of the plate extending beyond the bracket and bent downwardly and inwardly and with bent ends being arcuate in top plan, a second flat plate that is supported on the first named plate intermediate its ends and at a right angle thereto with the opposite ends of the plate being bent upwardly and inwardly to form arcuate hooks, the lamp socket supported on the second named plate intermediate its ends and with the bracket arm, plates and lamp socket being rigidly bolted together, the translucent cover being flexible and having an open lower end that is outwardly flared to have snapping engagement with the arcuate hooks, the lamp socket and cover being vertically disposed with the cover fully overlying the lamp socket and a lamp bulb supported therein, the shield being circumferentially spaced from the cover, the shield being cylindrical and open at its lower end to be axially engaged over the cover for frictional engagement with the arcuate ends of the first named plate, the cover and the shield being held in axial alignment, the side wings being integral with the shield and bendable to vary the arc of illumination and with the shield being rotatable to vary the arc of the illumination in a particular direction.

5. The device according to claim 4, wherein the vertical arm of the bracket extends below the lower end of the shield, the vertical arm being provided with a lateral stud adjacent its terminal end that is threaded for the reception of a nut, the arm being apertured adjacent the stud, the support comprising a flat elongated ground stake that is sharpened at one end, the opposite end of the ground stake being apertured for the reception of the stud and with the terminal end of the stake adjacent its aperture being bent laterally to form a lug that engages in the aperture of the bracket arm simultaneously with the engagement of the stud in the opening of the stake.

WALTER G. MOORE.

References Cited in the file of this patent

UNITED STATES PATENTS

| Number | Name | Date |
| --- | --- | --- |
| 685,806 | Weber | Nov. 5, 1901 |
| 1,366,710 | Anker | Jan. 25, 1921 |
| 1,530,804 | Anundi | Mar. 24, 1925 |
| 2,450,141 | Hobbs | Sept. 28, 1948 |
| 2,532,800 | Adinamis et al. | Dec. 5, 1950 |